United States Patent
Lawson et al.

(10) Patent No.: US 10,718,266 B2
(45) Date of Patent: Jul. 21, 2020

(54) VAPORIZATION SYSTEM FOR COMBUSTION SYSTEM

(71) Applicant: General Electric Company, Schenectady, NY (US)

(72) Inventors: William James Lawson, Niskayuna, NY (US); Seth Harmon Chapman, Anderson, SC (US)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 15/839,015

(22) Filed: Dec. 12, 2017

(65) Prior Publication Data
US 2018/0216534 A1    Aug. 2, 2018

Related U.S. Application Data

(60) Provisional application No. 62/452,725, filed on Jan. 31, 2017.

(51) Int. Cl.
| | |
|---|---|
| *F02C 7/143* | (2006.01) |
| *F02M 31/18* | (2006.01) |
| *F02C 7/224* | (2006.01) |
| *F02C 3/24* | (2006.01) |

(52) U.S. Cl.
CPC ............. *F02C 7/143* (2013.01); *F02C 3/24* (2013.01); *F02C 7/224* (2013.01); *F02M 31/18* (2013.01); *Y02T 10/126* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,485,073 A | * | 10/1949 | Shiffler | C10G 35/06 208/135 |
| 2,783,186 A | * | 2/1957 | Eastwood | B01J 8/12 208/169 |
| 6,367,258 B1 | * | 4/2002 | Wen | F02C 3/22 60/641.1 |
| 8,372,170 B2 | * | 2/2013 | Woods | C01B 3/384 422/625 |
| 2004/0134194 A1 | * | 7/2004 | Roby | F02C 3/24 60/750 |
| 2008/0226955 A1 | * | 9/2008 | Scotto | C01B 3/386 429/415 |
| 2012/0079851 A1 | * | 4/2012 | Heath | B01D 3/06 62/617 |
| 2014/0105816 A1 | * | 4/2014 | Grannell | C01B 3/06 423/658.2 |

* cited by examiner

*Primary Examiner* — Steven S Anderson, II
(74) *Attorney, Agent, or Firm* — Charlotte Wilson; Hoffman Warnick LLC

(57) ABSTRACT

A vaporization system for a liquid hydrocarbon for a combustion system of a gas turbine system is provided. The vaporization system includes: a vaporizer vessel; a pressure source providing a pressurized fluid to the vaporizer vessel; and a controller configured to control at least one control valve to: pre-elevate a pressure in the vaporizer vessel using the pressurized fluid from the pressure source prior to introduction of the liquid hydrocarbon to the vaporizer vessel to at least reduce vaporization of the liquid hydrocarbon in the vaporizer vessel, and control vaporization of the liquid hydrocarbon in the vaporizer vessel. A combustion system and kettle boiler system including aspects of the vaporization system are also disclosed.

15 Claims, 7 Drawing Sheets

VAPORIZATION SYSTEM FOR COMBUSTION SYSTEM

CROSS REFERENCE TO RELATED APPLICATIONS

This patent application claims the benefit of U.S. Provisional Application No. 62/452,725 which was filed on 31 Jan. 2017 and is incorporated as though fully set forth herein.

BACKGROUND OF THE INVENTION

The disclosure relates generally to combustion systems, and more particularly, to a vaporization system for a combustion system of, for example, a gas turbine system.

Gas turbine systems generate power by burning a fuel in a combustion system and directing a flow of combusted fuel to drive a turbine to generate power. A combustion system of the gas turbine system may burn a variety of hydrocarbon fuels in a combustor thereof. For example, combustors commonly burn both liquid and gas fuels. Liquid fuels may include, for example, fuel injected oil, and gas fuels may include, for example, natural gas. Each fuel is typically conditioned by respective liquid or gas fuel conditioning and control systems upstream of the combustor. Conditioning and control systems may include control a variety of factors such as, for a liquid fuel: removal of unwanted liquids (e.g., water) or materials (e.g., sediment), performance fuel heating, splitting of fuel flow to different combustor elements, distribution of fuel to various combustors by controlling a number of valves, etc.

Gas fuels are delivered to a gas fuel conditioning and control system under pressure either directly or from a vaporization system that delivers or stores them as liquid and vaporizes them as needed. For conventional gas fuel, such as methane ($CH_4$), the gas may be delivered, via a supply pipeline, to a gas fuel conditioning and control system.

Currently, other liquid hydrocarbons usable for a gas turbine combustion system are increasingly available. For example, ethane, propane, butane, iso-pentane, are more readily available. Use of these liquid hydrocarbons presents a challenge, however, because they transition from a liquid to a vapor quickly through pressure reduction that creates excessive adiabatic cooling. The adiabatic cooling is oftentimes sufficient to decrease local temperatures below material property limits (e.g., of a holding receptacle and/or related system's), potentially reducing material structural strength capabilities. Further, expansion from liquid to vapor occurs when filling a low pressure (e.g., ambient pressure) vessel with a liquid hydrocarbon, which impedes or delays formation of a measurable and controllable liquid level such that vaporization can be controlled in a conventional manner, e.g., via controlled heating of the liquid hydrocarbon with a stable controlled liquid level. One approach to addressing the challenge is to select holding receptacle material properties capable of withstanding the temperatures that occur during adiabatic cooling when filling the holding receptacle. However, such materials increase the cost of such holding receptacles. Another approach is to reduce the liquid hydrocarbon temperature to extremely low conditions (e.g., below dew point) resulting in the hydrocarbon remaining in liquid form during the high to low pressure transition. This approach however is impractical and excessively costly.

BRIEF DESCRIPTION OF THE INVENTION

A first aspect of the disclosure provides a vaporization system for a liquid hydrocarbon, the vaporization system comprising: a vaporizer vessel; a pressure source providing a pressurized fluid to the vaporizer vessel; and a controller configured to control at least one control valve to: pre-elevate a pressure in the vaporizer vessel using the pressurized fluid from the pressure source prior to introduction of the liquid hydrocarbon to the vaporizer vessel to at least reduce vaporization of the liquid hydrocarbon in the vaporizer vessel, and control vaporization of the liquid hydrocarbon in the vaporizer vessel.

A second aspect of the disclosure provides a combustion system for a gas turbine system, the combustion system comprising: a combustor upstream of the gas turbine and configured to burn at least a gaseous hydrocarbon converted from a liquid hydrocarbon; a gas fuel conditioning system operatively coupled of the combustor for conditioning the gaseous hydrocarbon prior to delivery to the combustor; a vaporization system for the liquid hydrocarbon upstream of the gas fuel conditioning system, the vaporization system including: a vaporizer vessel, a pressure source providing a pressurized fluid to the vaporizer vessel, and a controller configured to control at least one control valve to: pre-elevate a pressure in the vaporizer vessel using the pressurized fluid from the pressure source prior to introduction of the liquid hydrocarbon to the vaporizer vessel to at least reduce vaporization of the liquid hydrocarbon in the vaporizer vessel, and control vaporization of the liquid hydrocarbon in the vaporizer vessel prior to delivery to the gas fuel conditioning system.

A third aspect of the disclosure provides a method of controlling vaporization of a liquid hydrocarbon in a kettle boiler, the kettle boiler including a holding receptacle and a heating element, the method comprising: pre-filling the holding receptacle with a pressurized fluid to a pressure above a vaporization pressure of the liquid hydrocarbon at a temperature in the holding receptacle; filling the holding receptacle with the liquid hydrocarbon above an upper level of the heating element; and heating the liquid hydrocarbon to controllably vaporize the liquid hydrocarbon into a gaseous hydrocarbon.

A fourth aspect includes a kettle boiler system for a liquid hydrocarbon for a combustion system of a gas turbine system, the kettle boiler system comprising: a holding receptacle for the liquid hydrocarbon; a heating element within the holding receptacle for heating the liquid hydrocarbon to vaporize the liquid hydrocarbon; a pressure source providing a pressurized fluid to the holding receptacle; and a controller configured to control at least one control valve to: pre-elevate a pressure in the holding receptacle using the pressurized fluid from the pressure source prior to introduction of the liquid hydrocarbon to the holding receptacle to at least reduce vaporization of the liquid hydrocarbon in the holding receptacle, and control vaporization of the liquid hydrocarbon in the holding receptacle.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant system components. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the gas or liquid fuel through a combustion system or, for example, the flow of air through a combustor or coolant through one of the turbine's component systems. The term "downstream" corresponds to the direction of flow of the fluid, and the term "upstream" or "back" refers to the direction opposite to the flow.

The present disclosure provides a vaporization system and a combustion system that employs such a vaporization system in which a vaporization vessel is configured to be prefilled with a pressurized fluid, such as methane or nitrogen, prior to admitting a liquid hydrocarbon thereto. The pressure rise in the vaporization vessel minimizes the pressure difference observed by the liquid hydrocarbon when admitted, reducing or eliminating the duration and magnitude of flashing of the liquid hydrocarbon. Consequently, initially filling the vaporization vessel reduces or eliminates adiabatic cooling, and promotes more rapid formation of a desired hydrocarbon liquid level. The vaporization vessel may take a variety of forms such as but not limited to: a holding receptacle for holding the liquid hydrocarbon, e.g., a tank, or a conduit configured to carry the liquid hydrocarbon.

Figure 1:
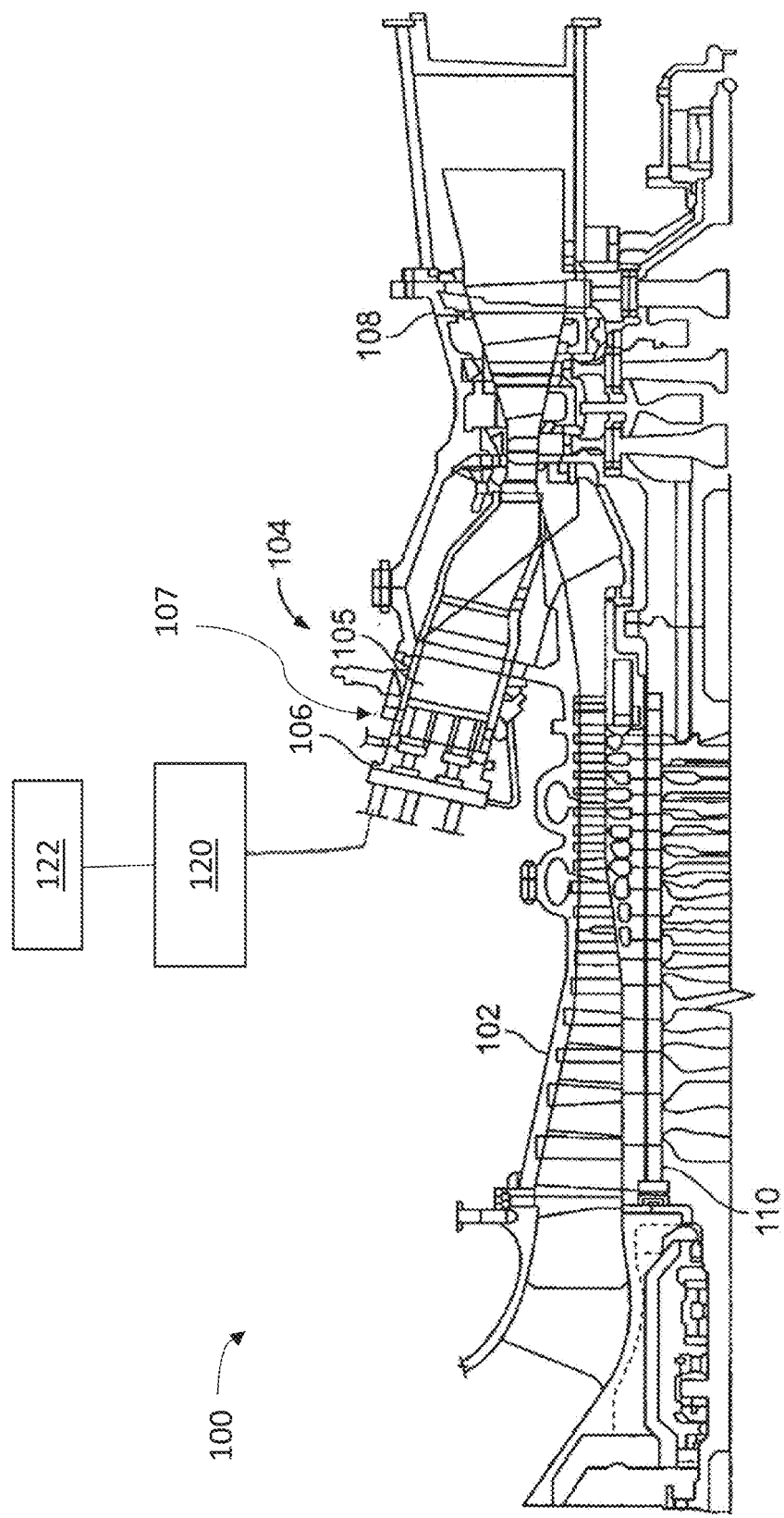
FIG. 1 is a schematic illustration of an example gas turbine system.

FIG. 1 is a schematic illustration of an illustrative gas turbine system 100. System 100 includes a compressor 102 and a combustor 104. Combustor 104 includes a combustion region 105 and a fuel nozzle assembly 106. Engine 100 also includes a turbine 108 and a common compressor/turbine shaft 110 (sometimes referred to as rotor 110). In one embodiment, system 100 is a MS9001FB engine, sometimes referred to as a 9FB engine, commercially available from General Electric Company, Greenville, S.C. The present disclosure is not limited to any one particular system and may be implanted in connection with other systems including, for example, the MS7001FA (7FA), MS9001FA (9FA), 7HA.01, 7HA02, 9HA.01, 9HA.02 and replacement F class or H class engine models of General Electric Company.

In operation, air flows through compressor 102 and compressed air is supplied to combustion system 104. Specifically, the compressed air is supplied to fuel nozzle assembly 106 that is integral to a combustor 107 including a combustion region 105. Assembly 106 is in flow communication with combustion region 105. Fuel nozzle assembly 106 is also in flow communication with a fuel conditioning system 120 and a vaporization system 122 according to embodiments of the disclosure. Fuel nozzle assembly 106 channels fuel and air to combustion region 105. Combustion system 104 ignites and combusts fuel. Combustion system 104 is in flow communication with turbine 108 for which gas stream thermal energy is converted to mechanical rotational energy. Turbine 108 is rotatably coupled to and drives rotor 110. Compressor 102 also is rotatably coupled to shaft 110. In the illustrative embodiment, combustion system 104 includes a plurality of combustors 107 and fuel nozzle assemblies 106, each operatively coupled to systems 120, 122. In the following discussion, unless otherwise indicated, only one of each component will be discussed.

Figure 2:
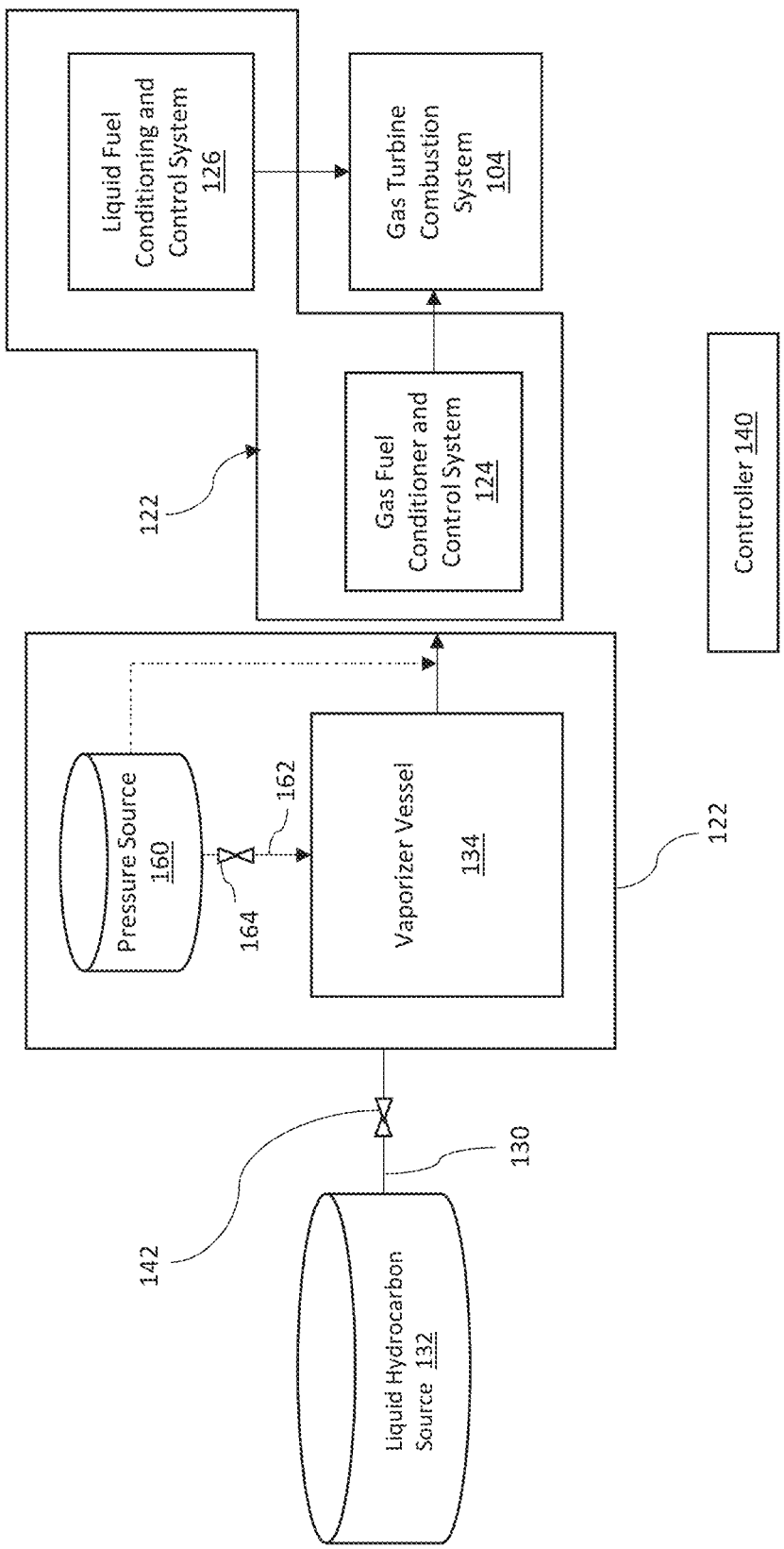
FIG. 2 shows a general schematic illustration of a vaporization system according to embodiments of the disclosure.

FIG. 2 shows a schematic view of a vaporization system 122 with a fuel conditioning system 120 according to embodiments of the disclosure. Fuel conditioning system 120 may include a gas fuel conditioning and control system 124 and may optionally include, where both gas and liquid fuel are used, a liquid fuel conditioning and control system 126. Gas fuel conditioning and control system 124 ("GFCC system") may include any now known or later developed conditioning system for gas fuels. GFCC system 124 may function to, among other things, removal of unwanted fuel constituents (e.g., water, incombustible gases, etc.), fuel heating, performance heating, distribution of fuel to various combustors by controlling a number of valves, filtration, pressure reduction, superheating, etc. Similarly, liquid fuel conditioning and control system 126 ("LFCC system") may include control of, among other things: removal of unwanted constituents (e.g., liquids like water, sediment, etc.), fuel heating, distribution of fuel to various combustors by controlling a number of valves, filtration, pressure reduction, superheating, etc. GFCC system 124 and LFCC system 126 are operatively coupled to combustion system 104 in a conventional fashion.

Vaporization system 122 is positioned upstream of GFCC system 124 to control vaporization of a liquid hydrocarbon 130 provided from a liquid hydrocarbon source 132. Source 132 can be any now known or later developed source of liquid hydrocarbon, e.g., separator, delivery conduit/pipeline, storage tank, etc. A controller 140, described in greater detail herein, may control a control valve 142 that controls flow of liquid hydrocarbon 130 from source 132. Although applicable to any liquid hydrocarbon 130, embodiments of the disclosure are described relative to liquid hydrocarbons that vaporize quickly when exposed to a pressure difference and cause adiabatic cooling during expansion to vapor. Liquid hydrocarbon 130 may include but is not limited to: ethane, propane, natural gas, butane and iso-pentane. As understood, each form of liquid hydrocarbon may include various forms of other constituents, e.g., liquid natural gas (LNG) may include up to 2% ethane and still be considered LNG.

Vaporization system 122 may include a vaporizer vessel 134, which may include any structure that can contain a hydrocarbon gas. As will be described herein, in one embodiment, vaporizer vessel 134 (FIGS. 3-5) may include a holding receptacle 136, which may include any form of container, tank, holder, repository, reservoir, etc. As will also be described herein, in another embodiment, vaporizer vessel 134 (FIG. 6) may include a conduit 138. Conduit 138 may include any pipe, channel, tube, etc., capable of containing a gas. Regardless of form, vaporizer vessel 134 may be made of, for example, steel alloys or other metals, having sufficient corrosion resistance and strength to handle liquid or gaseous hydrocarbons.

Figure 3:
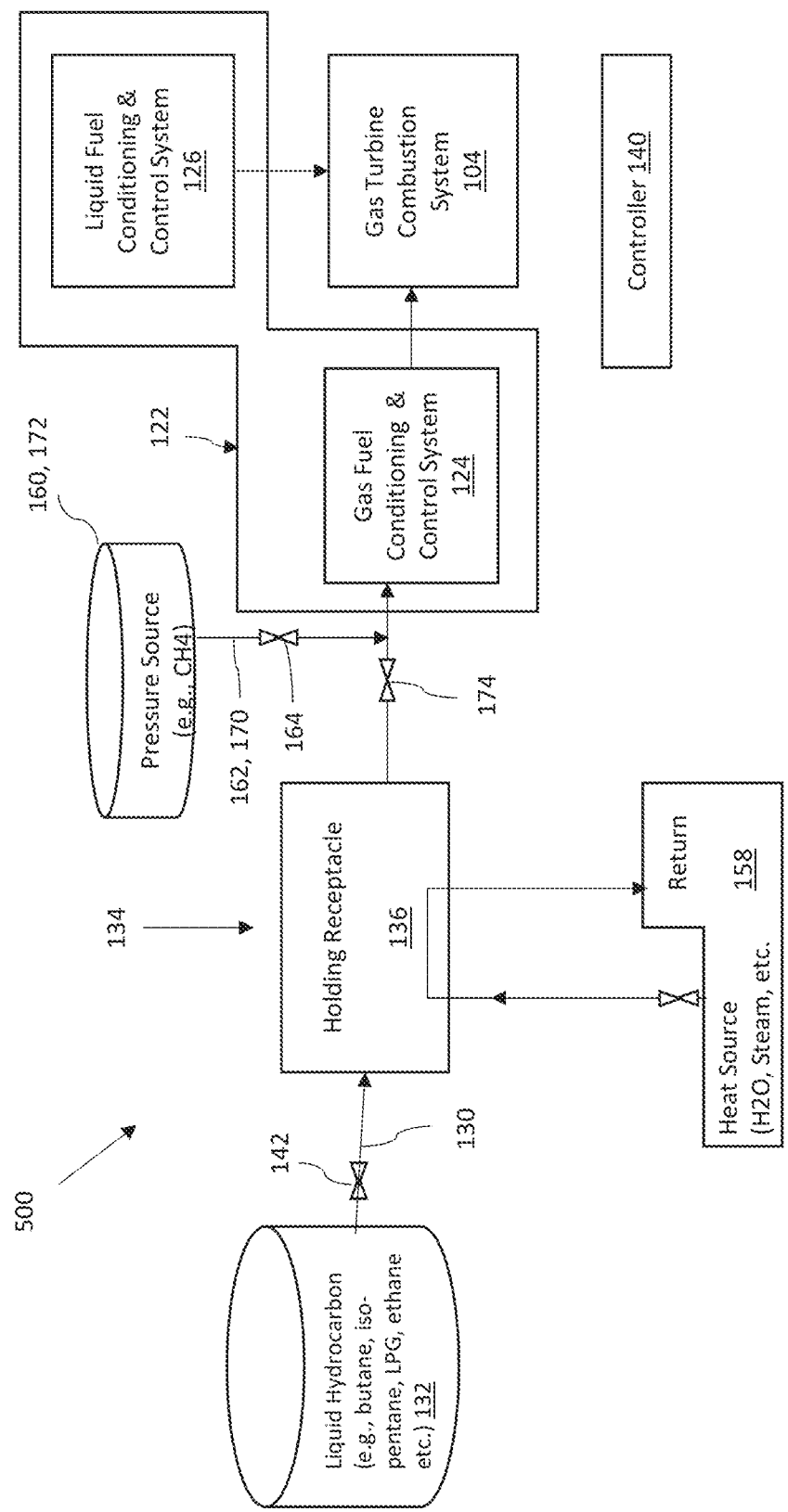
FIG. 3 shows a schematic illustration of a vaporization system using a holding receptacle as a vaporizer vessel and using a gaseous hydrocarbon as a pressurized fluid according to embodiments of the disclosure.
Figure 4:
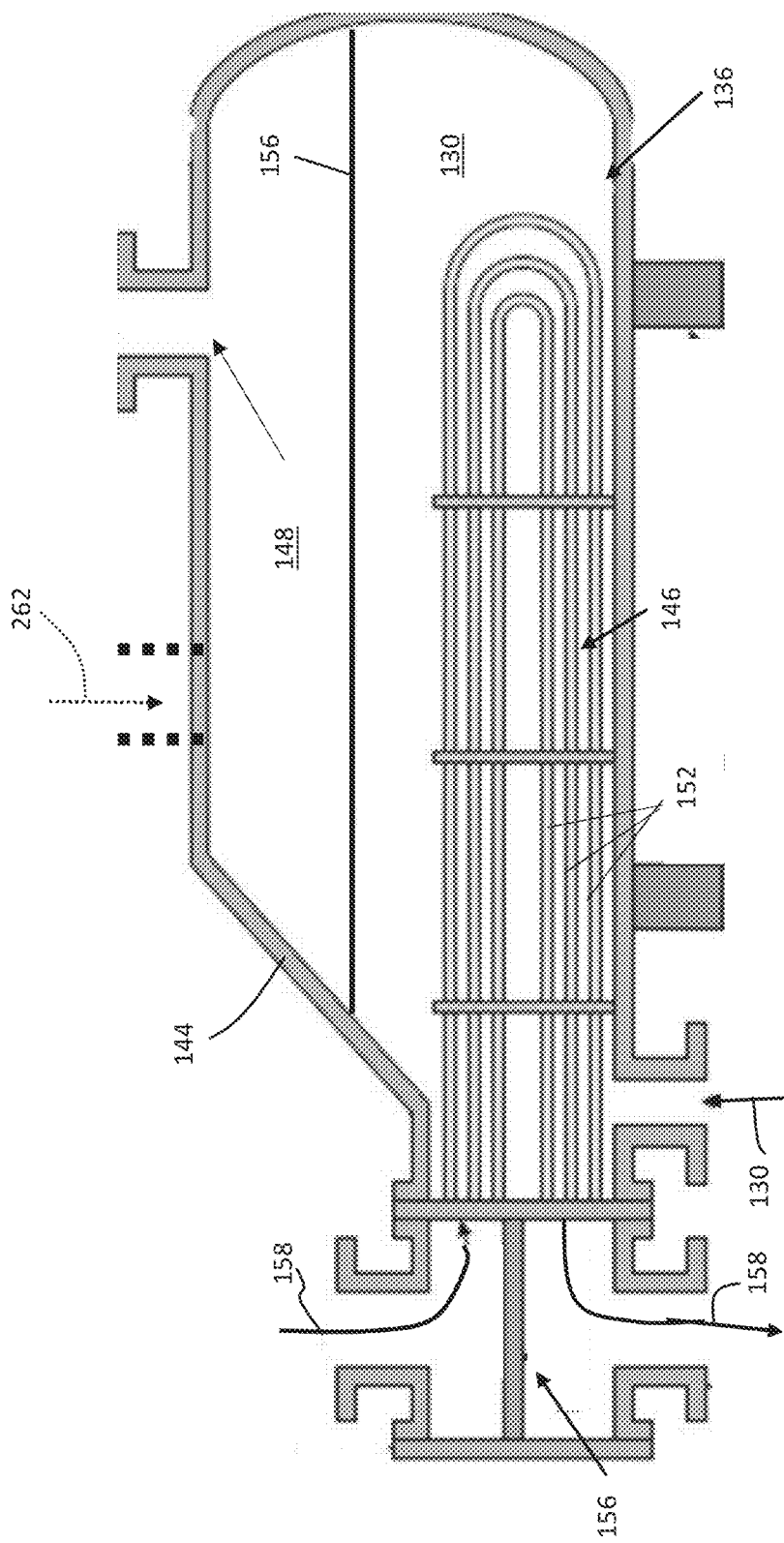
FIG. 4 shows a cross-sectional view of an example holding receptacle according to embodiments of the disclosure.

With reference to FIG. 4, a cross-sectional view of one example of holding receptacle 136 is illustrated. Holding receptacle 136 may include a holding tank 144. Holding receptacle 136 may also include a heating element 146 within holding receptacle 144 and under control of controller 140 (FIG. 3) for heating liquid hydrocarbon 130 to vaporize the liquid hydrocarbon, i.e., into gaseous hydrocarbon 148. As the term "gaseous hydrocarbon" refers to the heated liquid hydrocarbon, it may include gaseous or vaporized hydrocarbon. In this setting, holding receptacle 136 may be referred to as a kettle boiler, and the components that feed to it per embodiments of the disclosure may form a kettle boiler system. Heating element 146 may include any now known or later developed heating structure capable of heating liquid hydrocarbon 130 within holding receptacle 144. In the illustrated example, heating element 146 includes a number of U-shaped tubes 150 extending into holding receptacle 144 below a desired liquid hydrocarbon level 154. U-shaped tubes 150 are fluidly coupled to a heat source manifold 156 capable of delivering a heat source 158 to U-shaped tubes 150, and return heat source 158 to a source thereof (not shown). Heat source 158 may be any form of thermally conductive fluid, e.g., hot water, steam, etc.

Referring to FIG. 2 again, vaporization system 122 may also include a pressure source 160 providing a pressurized fluid 162 to vaporizer vessel 134. Flow of pressurized fluid 162 may be controlled by controller 140 by way of a control valve 164.

Vaporization system 122 also includes controller 140, which is configured to control at least one control valve to: pre-elevate a pressure in vaporizer vessel 134 using pressurized fluid 162 from pressure source 160 prior to introduction of liquid hydrocarbon 130 to vaporizer vessel 134 to reduce or eliminate vaporization of liquid hydrocarbon 130 (i.e., to gaseous hydrocarbon) in vaporizer vessel 134 during an initial fill process. Controller 140 may also control vaporization of liquid hydrocarbon 130 in vaporizer vessel 134, e.g., by controlling a temperature of liquid hydrocarbon 134 (e.g., via heating element 146) or by controlling a pressure within vaporizer vessel 134.

Figure 5:
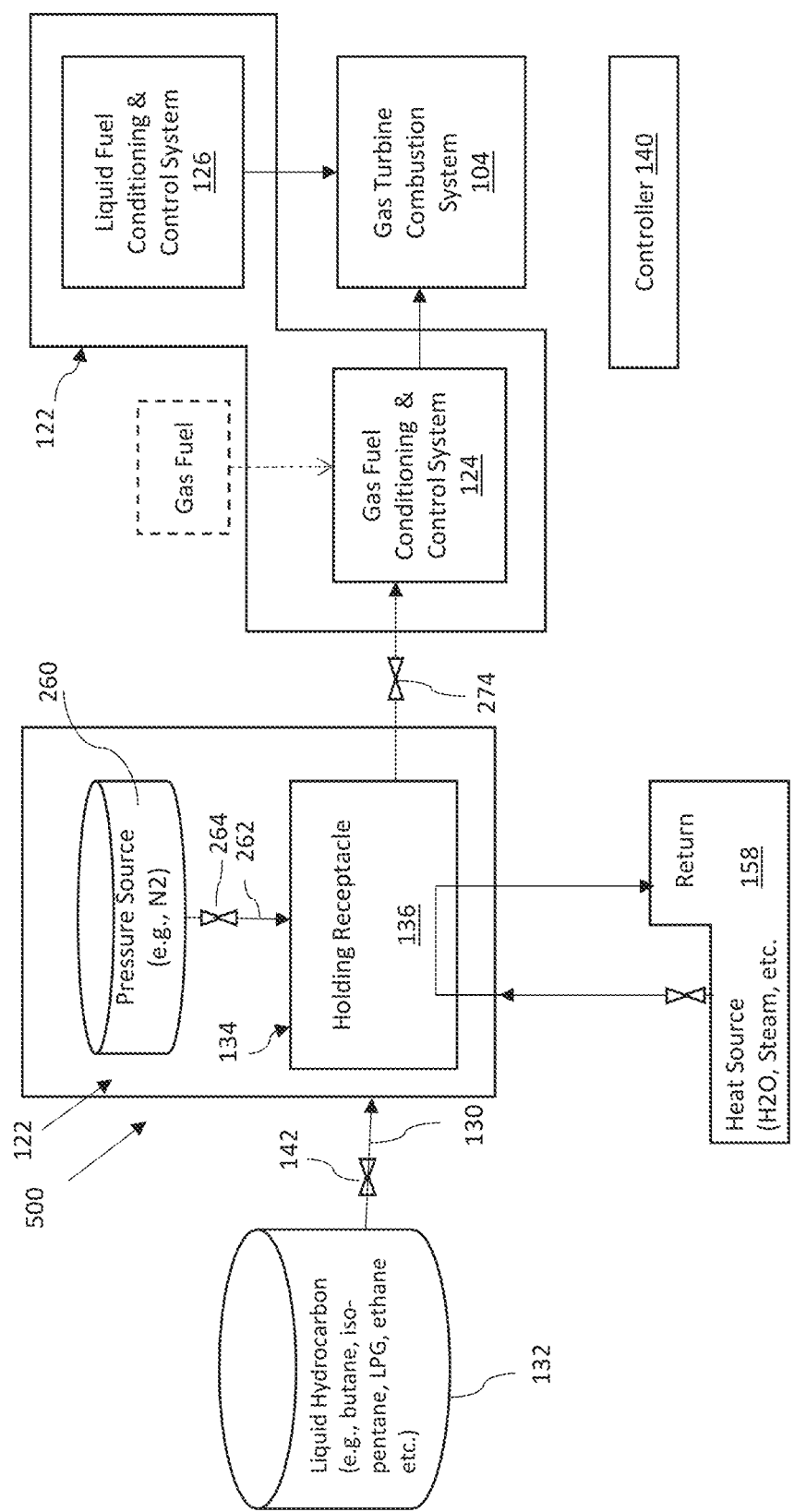
FIG. 5 shows a schematic illustration of a vaporization system using a holding receptacle as a vaporizer vessel and using an inert gas as a pressurized fluid according to embodiments of the disclosure.
Figure 6:
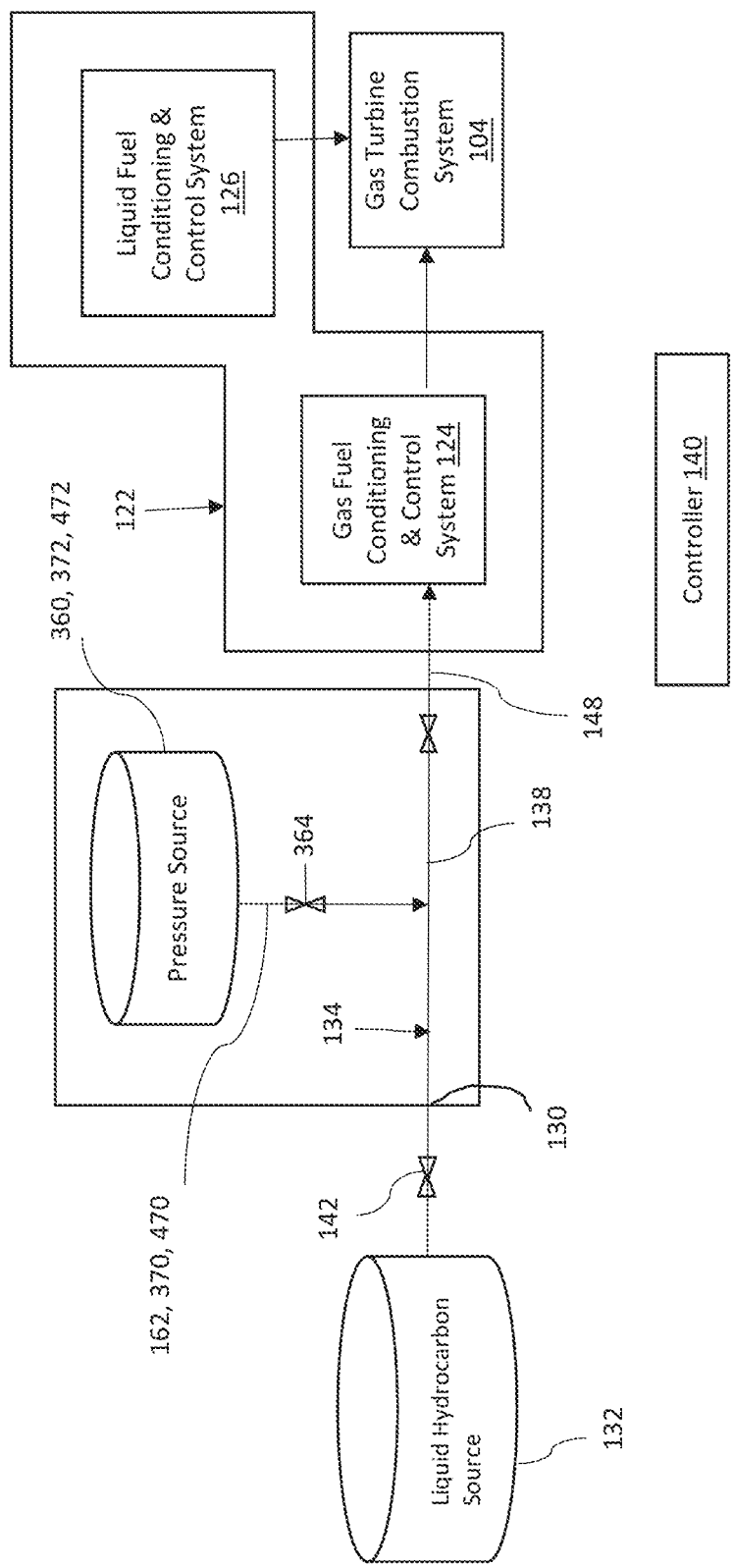
FIG. 6 shows a schematic illustration of a vaporization system using a conduit as a vaporizer vessel according to embodiments of the disclosure.
Figure 7:
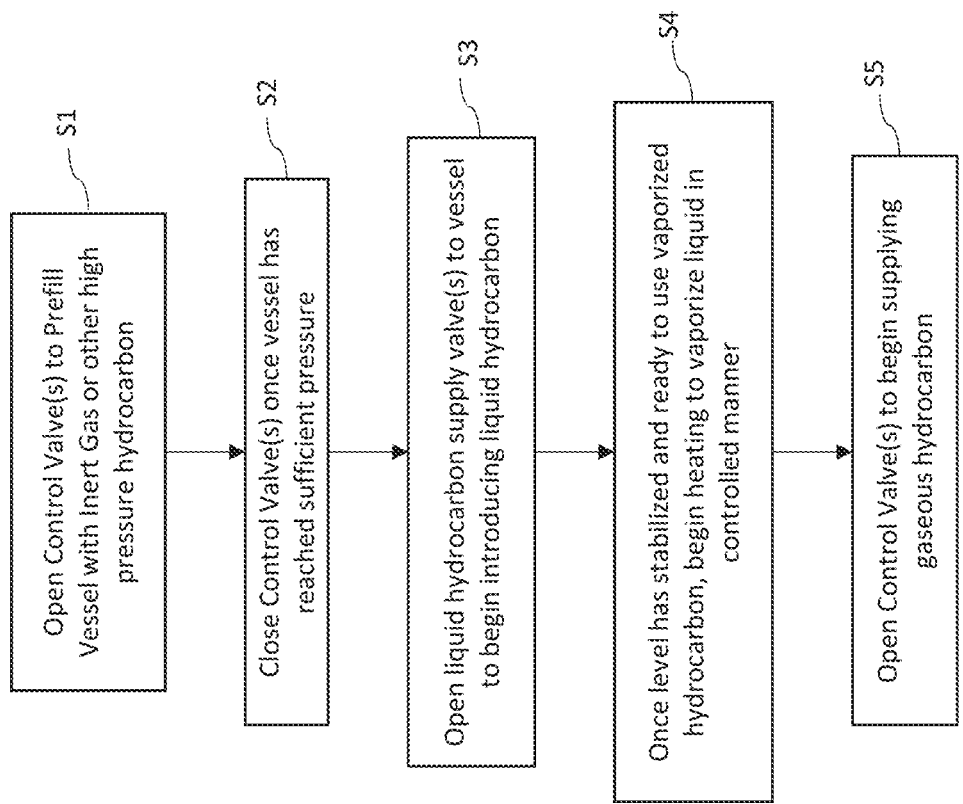
FIG. 7 shows a flow diagram of one operational method of a vaporization system according to embodiments of the disclosure.

FIGS. 3, 5 and 6 show schematic views of particular alternative embodiments of the disclosure, and FIG. 7 shows a flow diagram of a method of operation of the various embodiments of the disclosure that will be referenced in describing some of the various embodiments.

Referring to FIG. 3, in one embodiment, vaporizing vessel 134 includes holding receptacle 136 (i.e., kettle boiler including holding receptacle and heating element, as described previously) and pressurized fluid 162 may include a pressurized gaseous hydrocarbon 170 from a pressurized gaseous hydrocarbon fuel source 172, i.e., pressure source 160, operatively coupled to combustion system 104 downstream of holding receptacle 136. Source 172 can be any now known or later developed source of gaseous hydrocarbon, e.g., gas separator, delivery conduit/pipeline, storage tank, etc. Pressurized gaseous hydrocarbon 170 may include any form of gaseous hydrocarbon used by combustion system 104, e.g., natural gas or methane. In this case, a control valve 174 controls back flow, i.e., upstream flow, of pressurized gaseous hydrocarbon 170 from the pressurized gaseous hydrocarbon fuel source 174 to vaporizer vessel 136.

In operation, with reference to FIGS. 3 and 7, in step S1 (FIG. 7), controller 140 may open control valve 172 (control valve 164 is also open in this setting) to prefill vaporizer vessel 134 in the form of holding receptacle 136 to a pressure above a vaporization pressure of liquid hydrocarbon 130 at a temperature in holding receptacle 136 with pressurized fluid 162. It is noted that particular pressure necessary to prevent flashing of the particular liquid hydrocarbon 130, i.e., vaporization pressure, will vary depending on the pressure-temperature vaporization characteristics of the particular liquid hydrocarbon. In any event, pressurized gaseous hydrocarbon 170 pressurizes holding receptacle 136. Here, since gaseous hydrocarbon 172 is already available no additional pressure source 160 other than what would normally be present is required.

Once a pressure sufficient to maintain the particular liquid hydrocarbon 130 in a liquid state is introduced to holding receptacle 136, in step S2, controller 140 closes control valve 172. Next, at step S3 (FIG. 7), controller 140 controls control valve 142 to fill holding receptacle 136 with liquid hydrocarbon 130 above an upper level of heating element 146 (see level 154 in FIG. 4). Once the desired level is achieved, at step S4, controller 140 may control heating element 146 to heat liquid hydrocarbon 130 to controllably vaporize the liquid hydrocarbon into gaseous hydrocarbon 148 (FIG. 4). The temperature rise necessary will vary depending on the pressure-temperature vaporization characteristics of the particular liquid hydrocarbon. Controller 140 may also control other control valves, e.g., control valves 164, 174 among others, at step S5, to deliver/supply gaseous hydrocarbon 148 to combustion system 104 of gas turbine system 100 (FIG. 1). In this setting, leaving control valve 164 open allows pressurized gaseous hydrocarbon 170 to combine with gaseous hydrocarbon 148 vaporized in holding receptacle 136 to form a gas fuel for combustion system 104.

Referring to FIG. 5, a schematic illustration of another embodiment of vaporization system 122 is shown. In this embodiment, the pressurized fluid includes a pressurized inert gas 262 from a pressurized inert gas source 260 operatively coupled (directly) to holding receptacle 136 (see phantom input in FIG. 4). Any inert gas may be used. In one embodiment, the inert gas may include nitrogen. Pressurized inert gas source 260 may include any now known or later developed source of inert gas, e.g., gas separator, delivery conduit/pipeline, storage tank, etc. Controller 140 controls a first control valve 264 controlling flow of pressurized inert gas 262 from pressurized inert gas source 260 to holding receptacle 136, and a second control valve 142 controls flow of gaseous hydrocarbon 148 (FIG. 4) from holding receptacle 136 to combustion system 104.

In operation, with reference to FIGS. 5 and 7, in step S1 (FIG. 7), controller 140 may open control valve 264 to prefill vaporizer vessel 134 in the form of holding receptacle 136 to a pressure above a vaporization pressure of liquid hydrocarbon 130 at a temperature in holding receptacle 136 with pressurized fluid 262, i.e., inert gas. As noted previously, the particular pressure necessary to prevent flashing of the particular liquid hydrocarbon 130, i.e., vaporization pressure, will vary depending on the pressure-temperature vaporization characteristics of the particular liquid hydrocarbon. In any event, inert gas 262 pressurizes holding receptacle 136. Once a pressure sufficient to maintain the particular liquid hydrocarbon 130 in a liquid state is introduced to holding receptacle 136, in step S2, controller 140 closes control valve 264. Next, at step S3 (FIG. 7), controller 140 controls control valve 142 to fill holding receptacle 136 with liquid hydrocarbon 130 above an upper level of heating element 146 (see level 154 in FIG. 4). Once the desired level is achieved, at step S4, controller 140 may control heating element 146 to heat liquid hydrocarbon 130 to controllably vaporize the liquid hydrocarbon into gaseous hydrocarbon 148 (FIG. 4). The temperature rise necessary will vary depending on the pressure-temperature vaporization characteristics of the particular liquid hydrocarbon. Controller 140 may also control other control valves, e.g., control valves 264, 274 among others, at step S5, to deliver/supply gaseous hydrocarbon 148 to combustion system 104 of gas turbine system 100 (FIG. 1). In this setting, GFCC system 124 may optionally include provisions for removing inert gas 262 from gaseous hydrocarbon 148.D Referring to FIG. 6, in another embodiment, vaporizer vessel 134 may include a conduit 138. As noted previously, conduit 138 may include any pipe, channel, tube, etc., capable of containing a gas. In one embodiment, pressurized fluid 362 may include a pressurized gaseous hydrocarbon 370 from a pressurized gaseous hydrocarbon fuel source 372 operatively coupled to conduit 138 by the at least one control valve 364. Pressurized gaseous hydrocarbon source 372 may include any now known or later developed source of pressurized gaseous hydrocarbon, e.g., gas separator, delivery conduit/pipeline, storage tank, etc. In another embodiment, pressurized fluid 362 may include a pressurized inert gas 470 from a pressurized inert gas source 472 operatively coupled to the conduit by the at least one control valve. Pressurized inert gas source 472 may include any now known or later developed source of inert gas, e.g., gas separator, delivery conduit/pipeline, storage tank, etc. In either embodiment, operation may include controller 140 controlling vaporization of liquid hydrocarbon 130 by controlling a pressure within conduit 138. Liquid hydrocarbon 130 conversion to gaseous hydrocarbon 148 may thus be controlled within conduit 138.

Any vaporization system 122 described herein can further include a superheater (not shown) upstream of GFCC system 124, e.g., between control valve 174 or 274 and GFCC system 124 in FIGS. 3 and 5, respectively. The superheater may be supplied with any form of heat source, e.g., hot water, steam, etc.

In another embodiment, a combustion system 104 for a gas turbine system 100 is provided. Combustion system 104 may include a combustor 107 (FIG. 1) upstream of a gas turbine 108 and configured to burn at least a gaseous hydrocarbon 148 (FIG. 4) converted from a liquid hydrocarbon 130, as described herein. As illustrated in FIGS. 2, 3, 5 and 6, combustion system 104 may also optionally additionally burn a liquid fuel conditioned by LFCC system 126 and supplied in a conventional manner. Combustion system 104 may also include GFCC system 124 operatively coupled to the combustor 107 (FIG. 1) for conditioning gaseous hydrocarbon 148 prior to delivery to the combustor 107. Combustion system 104 also includes a vaporization system 122 for liquid hydrocarbon 130 upstream of GFCC system 124. Vaporization system 122 may include any embodiment previously described herein.

In another embodiment, as shown in FIGS. 3 and 5, a kettle boiler system 500 for a liquid hydrocarbon 130 for combustion system 104 of gas turbine system 100 (FIG. 1) may also be provided. Kettle boiler system 500 may include holding receptacle 136 for liquid hydrocarbon 130, and heating element 146 (FIG. 4) within holding receptacle 136 for heating the liquid hydrocarbon 130 to vaporize the liquid hydrocarbon. System 500 may also include a pressure source 160 or 260 providing a pressurized fluid 162 or 262 to holding receptacle 136. Controller 140 is configured to control at least one control valve to: pre-elevate a pressure in holding receptacle 136 using pressurized fluid 162, 262 from pressure source 160, 260 prior to introduction of the liquid hydrocarbon to the holding receptacle to at least reduce (and possibly eliminate) vaporization of the liquid hydrocarbon in the holding receptacle. Controller 140 of kettle boiler system 500 may also control vaporization of the liquid hydrocarbon in the holding receptacle, as described herein.

In any of the embodiments described herein, controller 140 may include any now known or later developed industrial controller capable of being configured, e.g., programmed or electrically structured with hardware, to carry out the functions described herein. Controller 140 may be a standalone controller or part of a larger gas turbine system controller. It is noted that a variety of sensors may be employed to measure any necessary parameters, e.g., temperatures, pressures, flow rates, etc.

Vaporization system 122 provides a number of technical effects such as but not limited to: avoiding or minimizing transient adiabatic cooling resulting in system materials exposure to temperatures below material property limits; reduced time to stable liquid hydrocarbon level and system operation; and improved control over initial holding receptacle filling by minimizing or eliminating fluid phase change processes during an initial fill process with liquid hydrocarbon.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A vaporization system for a liquid hydrocarbon, the vaporization system comprising:
   a vaporizer vessel including a holding receptacle for the liquid hydrocarbon, and further comprising a heating element within the holding receptacle and under control of the controller for heating the liquid hydrocarbon to vaporize the liquid hydrocarbon, wherein the heating element includes a plurality of U-shaped tubes extending into the holding receptacle, the tubes fluidly connected to a heat source manifold;
   a pressurized gaseous hydrocarbon fuel source providing a pressurized gaseous hydrocarbon to the liquid vaporizer vessel; and
   a gas system turbine controller configured to control at least one control valve to: open the control valve to pre-fill the vaporizer vessel and pre-elevate a pressure in the vaporizer vessel to the pressure higher than a vaporization pressure of the liquid hydrocarbon and using the pressurized gaseous hydrocarbon from the pressurized gaseous hydrocarbon fuel source prior to introduction of the liquid hydrocarbon to the vaporizer vessel to at least reduce vaporization of the liquid hydrocarbon in the vaporizer vessel, and control vaporization of the liquid hydrocarbon in the vaporizer vessel.

2. The vaporization system of claim 1, wherein the at least one control valve includes a control valve controlling back flow of the pressurized gaseous hydrocarbon from the pressurized gaseous hydrocarbon fuel source to the holding receptacle.

3. The vaporization system of claim 1, wherein the pressurized gaseous hydrocarbon combines with the gaseous hydrocarbon vaporized in the holding receptacle to form a gas fuel for the combustion system.

4. The vaporization system of claim 1, wherein the vaporizer vessel includes a conduit.

5. The vaporization system of claim 4, wherein the pressurized fluid includes a pressurized gaseous hydrocarbon from a pressurized gaseous hydrocarbon fuel source operatively coupled to the conduit by the at least one control valve.

6. The vaporization system of claim 4, wherein the controller controls vaporization of the liquid hydrocarbon by controlling a pressure within the conduit.

7. The vaporization system of claim 1, wherein the liquid hydrocarbon is selected from the group consisting of: ethane, butane, propane, natural gas and iso-pentene.

8. A combustion system for a gas turbine system, the combustion system comprising:
   a combustor upstream of the gas turbine and configured to burn at least a gaseous hydrocarbon converted from a liquid hydrocarbon;
   a gas fuel conditioning system operatively coupled to the combustor for conditioning the gaseous hydrocarbon prior to delivery to the combustor;
   a vaporization system for the liquid hydrocarbon upstream of the gas fuel conditioning system, the vaporization system including:
      a vaporizer vessel including a holding receptacle for the liquid hydrocarbon, and further comprising a heating element within the holding receptacle and under control of the controller for heating the liquid hydrocarbon to vaporize the liquid hydrocarbon, wherein the heating element includes a plurality of U-shaped tubes extending into the holding receptacle, the tubes fluidly connected to a heat source manifold,
      a pressurized gaseous hydrocarbon fuel source providing a pressurized gaseous hydrocarbon to the vaporizer vessel, and
      a gas turbine system controller configured to control at least one control valve to: open the control valve to pre-fill the vaporizer vessel and pre-elevate a pressure in the vaporizer vessel to the pressure higher than a vaporization pressure of the liquid hydrocarbon and using the pressurized gaseous hydrocarbon from the pressurized gaseous hydrocarbon fuel source prior to introduction of the liquid hydrocarbon to the vaporizer vessel to at least reduce vaporization of the liquid hydrocarbon in the vaporizer vessel, and control vaporization of the liquid hydrocarbon in the vaporizer vessel prior to delivery to the gas fuel conditioning system.

9. The combustion system of claim 8, wherein the at least one control valve includes a control valve controlling back flow of a pressurized gaseous hydrocarbon from the pressurized gaseous hydrocarbon fuel source to the holding receptacle.

10. The combustion system of claim 8, wherein a pressurized gaseous hydrocarbon is delivered to the gas conditioning system with the gaseous hydrocarbon.

11. A kettle boiler system for a liquid hydrocarbon for a combustion system of a gas turbine system, the kettle boiler system comprising:
    a holding receptacle for the liquid hydrocarbon;

a heating element within the holding receptacle for heating the liquid hydrocarbon to vaporize the liquid hydrocarbon, wherein the heating element includes a plurality of U-shaped tubes extending into the holding receptacle, the tubes fluidly connected to a heat source manifold;

a pressurized gaseous hydrocarbon fuel source providing a pressurized gaseous hydrocarbon to the holding receptacle; and a gas system turbine controller configured to control at least one control valve to: open the control valve to pre-fill the vaporizer vessel and pre-elevate a pressure in the vaporizer vessel to the pressure higher than a vaporization pressure of the liquid hydrocarbon and using the pressurized fluid from the pressurized gaseous hydrocarbon fuel source prior to introduction of the liquid hydrocarbon to the holding receptacle to at least reduce vaporization of the liquid hydrocarbon in the holding receptacle, and control vaporization of the liquid hydrocarbon in the holding receptacle.

12. The kettle boiler system of claim 11, wherein the at least one control valve includes a control valve controlling back flow of the pressurized gaseous hydrocarbon from the pressurized gaseous hydrocarbon fuel source to the holding receptacle.

13. The kettle boiler system of claim 11, wherein the pressurized gaseous hydrocarbon combines with the gaseous hydrocarbon vaporized in the holding receptacle to form a gas fuel for the combustion system.

14. The kettle boiler system of claim 11, wherein the pressurized fluid includes a pressurized inert gas from a pressurized inert gas source operatively coupled to the holding receptacle.

15. The kettle boiler system of claim 14, wherein the at least one control valve includes a first control valve controlling flow of the pressurized inert gas from the pressurized inert gas source to the holding receptacle, and a second control valve controlling flow of the gaseous hydrocarbon from the holding receptacle to the combustion system.

* * * * *